(12) United States Patent
Kang et al.

(10) Patent No.: US 11,820,420 B2
(45) Date of Patent: Nov. 21, 2023

(54) STEERING SHAFT TEMPORARY SUPPORT STRUCTURE OF VEHICLE

(71) Applicants: Hyundai Motor Company, Seoul (KR); Kia Corporation, Seoul (KR)

(72) Inventors: Shingyu Kang, Seoul (KR); Taeyong Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/524,604

(22) Filed: Nov. 11, 2021

(65) Prior Publication Data
US 2022/0289266 A1 Sep. 15, 2022

(30) Foreign Application Priority Data
Mar. 12, 2021 (KR) .................... 10-2021-0032676

(51) Int. Cl.
*B60R 13/08* (2006.01)
*B62D 1/16* (2006.01)
*B62D 1/20* (2006.01)

(52) U.S. Cl.
CPC ............ *B62D 1/16* (2013.01); *B60R 13/0846* (2013.01); *B60R 13/0853* (2013.01); *B62D 1/20* (2013.01)

(58) Field of Classification Search
CPC ... B60R 13/0846; B60R 13/0853; B62D 1/16; B62D 1/20
See application file for complete search history.

(56) References Cited

U.S. PATENT DOCUMENTS

2014/0033855 A1* 2/2014 Allen .................. B60R 13/0853
277/650

FOREIGN PATENT DOCUMENTS

| DE | 10010722 A1 | * | 9/2001 | ............ B60R 13/06 |
| DE | 102010012875 A1 | * | 9/2011 | ............ B60R 13/083 |
| FR | 3061881 A1 | * | 7/2018 | ......... B60R 13/0846 |
| FR | 3061881 B1 | * | 1/2020 | ......... B60R 13/0846 |
| JP | H07267102 A | * | 10/1995 | |
| JP | 2002053017 A | * | 2/2002 | ............ B60R 21/09 |
| JP | 2005205926 A | * | 8/2005 | ............ B60T 7/065 |
| JP | 2005205972 A | * | 8/2005 | ............ B60T 7/065 |
| JP | 2005206104 A | * | 8/2005 | |
| JP | 2016094167 A | * | 5/2016 | |
| WO | WO-2004020879 A1 | * | 3/2004 | ......... B60R 13/0846 |

* cited by examiner

Primary Examiner — Nicole T Verley
(74) Attorney, Agent, or Firm — Fox Rothschild LLP

(57) ABSTRACT

A steering shaft temporary support structure of a vehicle is connected by a yoke, and includes: a bulkhead that is mounted on surfaces of a dash panel and a housing inside the vehicle, surrounds an engine compartment, and is formed with an opening into which a steering shaft is inserted; and a dust cover that forms an insert passage of the steering shaft to correspond to the opening of the bulkhead, wherein the bulkhead includes a locking protrusion in which an end portion of the yoke is supported so as to not be separated in a downward direction.

20 Claims, 9 Drawing Sheets

Entry path when assembling engine

STEERING SHAFT TEMPORARY SUPPORT STRUCTURE OF VEHICLE

CROSS-REFERENCE TO RELATED APPLICATION

This application claims under 35 U.S.C. § 119 the benefit of Korean Patent Application No. 10-2021-0032676 filed in the Korean Intellectual Property Office on Mar. 12, 2021, the entire contents of which are incorporated herein by reference.

BACKGROUND

(a) Technical Field

The present disclosure relates to a steering shaft temporary support structure of a vehicle, more particularly, to the steering shaft temporary support structure that may avoid interference between an engine and a steering shaft when assembling the engine of the vehicle.

(b) Description of the Related Art

Generally, in a vehicle assembly process, as shown in FIG. 1 (RELATED ART), a steering shaft 3 of a vehicle is inserted into a dust cover 5 through an opening of a bulkhead 4 assembled to a vehicle body, and then an engine assembly process proceeds.

In the engine assembly process, an engine 1 is mounted in an engine compartment 2 in a temporary support state in which the steering shaft 3 is inserted into the dust cover 5. The engine 1 is lifted upward from a lower portion of the engine compartment 2, and in this case, the steering shaft 3 must be fixed so as to keep the steering shaft 3 inserted into the dust cover 5 so that the steering shaft 3 does not interfere with an entry path of the engine 1. Conventionally, for this purpose, a method of temporarily fixing the steering shaft 3 by using a fixing member such as an iron clip 7 welded to a side member 6 is used.

However, for this temporary fixing, a separate fixing member is required, and since an operation of fixing and releasing the steering shaft 3 to the side member 6 by manipulating the fixing member must be performed, assembly time may be increased.

In addition, as the separate fixing member is installed, a cost is incurred for this, and may result in an increase in vehicle weight.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a steering shaft temporary support structure of a vehicle that may reduce assembly time and a cost/weight by applying a structure that may temporarily support a steering shaft by using its own weight without applying a separate fixing member.

An embodiment of the present disclosure provides a steering shaft temporary support structure of a vehicle that is connected by a yoke, including: a bulkhead that is mounted on surfaces of a dash panel and a housing inside the vehicle, surrounds an engine compartment, and is formed with an opening into which a steering shaft is inserted; and a dust cover that forms an insert passage of the steering shaft to correspond to the opening of the bulkhead, wherein the bulkhead includes a locking protrusion in which an end portion of the yoke is supported so as to not be separated in a downward direction.

The dust cover may include a support point that supports the steering shaft.

The locking protrusion may be formed to protrude from the opening toward an outside of the bulkhead.

The bulkhead may further include a support surface that supports an upper surface of the yoke of the steering shaft.

In an upper portion of the opening of the bulkhead, a first anti-rotation guide part that supports an upper end of the yoke may be formed to prevent rotation of the steering shaft about an axial center thereof.

In the upper portion of the opening of the bulkhead, a first left and right fixed guide part that supports both sides of the yoke may be formed with a height protruding toward an outside of the opening, between the first anti-rotation guide part, so as to prevent the steering shaft from swinging in a left and right direction.

The support surface may be formed to protrude from the opening toward an inside of the bulkhead; and when the steering shaft is inserted within the bulkhead, an upper surface of the yoke may be supported in contact with a lower surface of the support surface by a weight of the steering shaft.

The support point may be formed at a lower portion of the dust cover spaced apart from the opening; and when the steering shaft is inserted within the bulkhead, a lower portion of the steering shaft may be supported in contact with the support point by a weight of the steering shaft.

The locking protrusion may be formed to protrude from the opening toward the inside of the bulkhead.

In an upper portion of the opening of the bulkhead, a second anti-rotation guide part that supports an upper end of the yoke may be formed to prevent rotation of the steering shaft about an axial center thereof.

In the upper portion of the opening of the bulkhead, a second left and right fixed guide part that supports both sides of the yoke may be formed with a height protruding toward a center of the opening, between the second anti-rotation guide part, so as to prevent the steering shaft from swinging in a left and right direction.

Another embodiment of the present disclosure provides a steering shaft temporary support structure of a vehicle that is connected by a yoke, including: a dust cover formed with an opening into which the steering shaft is inserted, wherein the dust cover includes a locking protrusion on which an end portion of the yoke is supported so as to not be separated in a downward direction, and a support point supporting the steering shaft.

The locking protrusion may be formed to protrude from the opening toward an outside of the dust cover.

The dust cover may further include a support surface that supports an upper surface of the yoke of the steering shaft.

In an upper portion of the opening of the dust cover, a third anti-rotation guide part that supports an upper end of the yoke may be formed to prevent rotation of the steering shaft about an axial center thereof.

In the upper portion of the opening of the dust cover, a third left and right fixed guide part that supports both sides of the yoke may be formed with a height protruding toward the outside of the opening, between the third anti-rotation guide part, so as to prevent the steering shaft from swinging in a left and right direction.

The support surface may be formed to protrude from the opening toward an inside of the dust cover; and when the steering shaft is inserted within the dust cover, an upper surface of the yoke may be supported in contact with a lower surface of the support surface by a weight of the steering shaft.

The locking protrusion may be formed to protrude from the opening toward the inside of the dust cover.

In an upper portion of the opening of the dust cover, a fourth anti-rotation guide part that supports an upper end of the yoke may be formed to prevent rotation of the steering shaft about an axial center thereof.

In the upper portion of the opening of the dust cover, a fourth left and right fixed guide part that supports both sides of the yoke may be formed with a height protruding toward a center of the opening, between the fourth anti-rotation guide part, so as to prevent the steering shaft from swinging in a left and right direction.

According to the embodiment of the present disclosure, it is possible to reduce cost and weight by applying a structure that may temporarily support a steering shaft by using its own weight without applying a separate fixing member.

In addition, it is possible to reduce assembly time by omitting fixing and releasing work of a steering shaft by a fixing member.

DETAILED DESCRIPTION OF THE EMBODIMENTS

Figure 1:
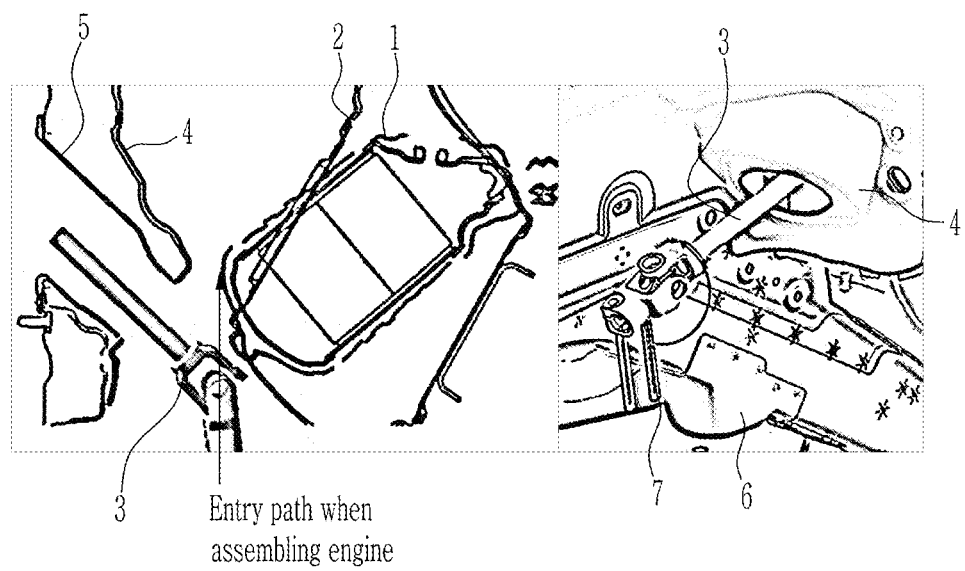
FIG. 1 (RELATED ART) illustrates a state of temporarily fixing a steering shaft during engine assembly in a conventional vehicle engine assembly process.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Further, with embodiments of the present disclosure, detailed description is made as to the constituent elements in a first embodiment with reference to the relevant drawings by using the same reference numerals for the same constituent elements, while only constituent elements that are different from those related to the first embodiment are described in other embodiments.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use same reference numerals for showing similar features. It will be understood that when an element such as a layer, film, region, area, or substrate is referred to as being "on" another element, it can be directly on the other element or intervening elements may also be present.

The embodiments of the present disclosure show embodiments of the present disclosure in detail. As a result, various modifications of the drawings will be expected. Therefore, the embodiments are not limited to a specific shape of an illustrated region, but, for example, include a change in the shape in accordance with manufacturing.

Hereinafter, a steering shaft temporary support structure of a vehicle according to an embodiment of the present disclosure will be described in detail with reference to the accompanying drawings.

Figure 2:
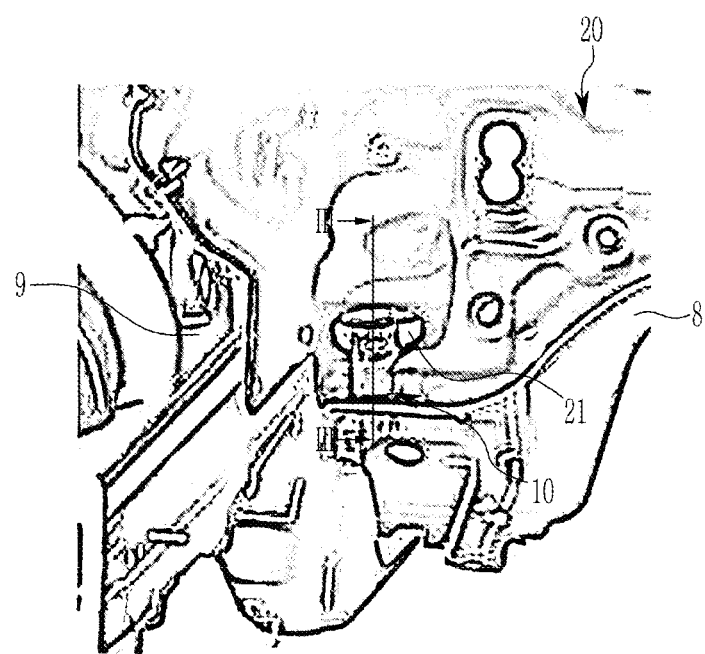
FIG. 2 illustrates a schematic view of a steering shaft temporary support structure of a vehicle according to an embodiment of the present disclosure.
Figure 3:
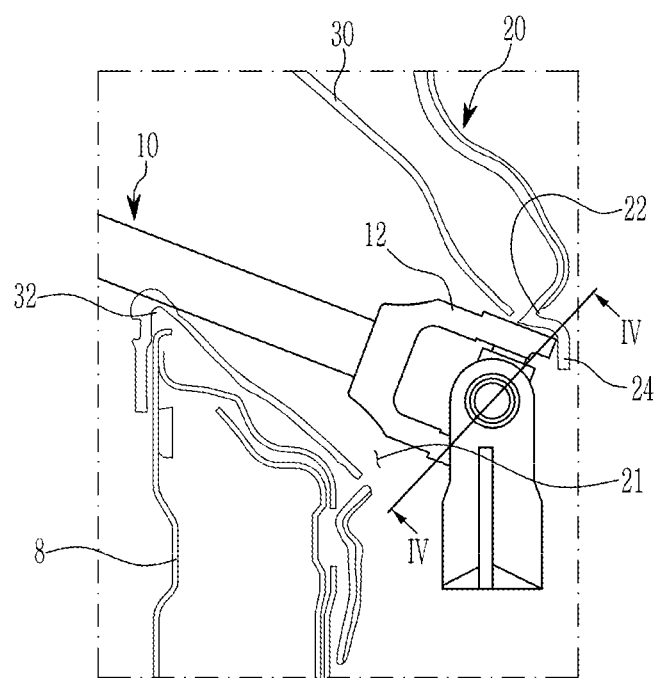
FIG. 3 illustrates a cross-sectional view taken along line of FIG. 2.
Figure 4:
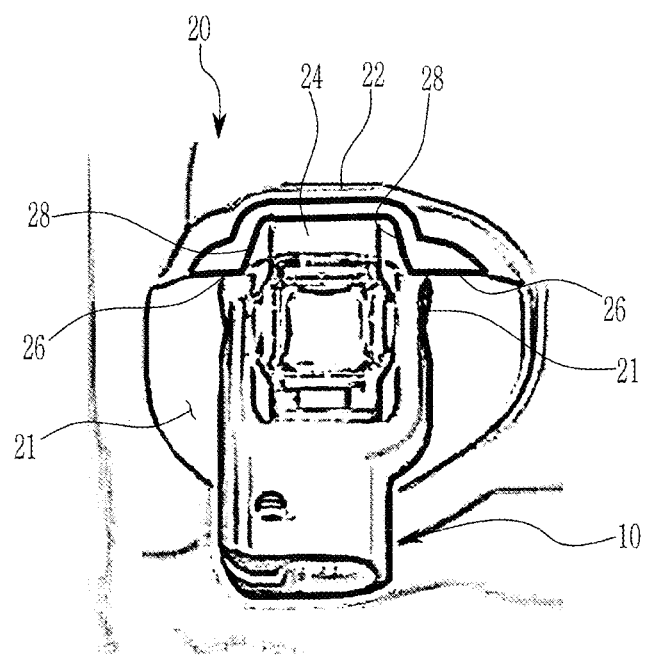
FIG. 4 illustrates a state viewed in a direction perpendicular to a direction of line IV-IV of FIG. 3.

FIG. 2 illustrates a schematic view of a steering shaft temporary support structure of a vehicle according to an embodiment of the present disclosure, FIG. 3 illustrates a cross-sectional view taken along line of FIG. 2, and FIG. 4 illustrates a state viewed in a direction perpendicular to a direction of line Iv-Iv of FIG. 3.

Referring to FIGS. 2 to 4, a steering shaft temporary support structure of a vehicle according to an embodiment of the present disclosure is a structure for temporarily supporting a steering shaft 10 of the vehicle by inserting the steering shaft 10 of the vehicle connected by a yoke 12 into a bulkhead 20 of the vehicle, and includes the bulkhead 20 and a dust cover 30.

The bulkhead 20 is mounted on surfaces of a dash panel 8 and a housing 9 inside the vehicle, surrounds an engine compartment, and is provided with an opening 21 into which the steering shaft 10 is inserted. The opening 21 is opened downward of a vehicle body, and the steering shaft 10 is inserted thereinto before an engine is mounted in the engine compartment.

After the steering shaft 10 is inserted into the bulkhead 20, the bulkhead 20 is provided with a locking protrusion 24 that allows an end portion of the yoke 12 to be supported so as to not be separated in a downward direction of the vehicle body. The locking protrusion 24 is formed to protrude from the opening toward an outside of the bulkhead 20.

In addition, the bulkhead 20 further includes a support surface 22 for supporting an upper surface of the yoke 12 of the steering shaft 10. The support surface 22 may be formed to protrude from the opening 21 toward an inside of the bulkhead 20. The upper surface of the yoke 12 may be supported in contact with a lower surface of the support surface 22.

The dust cover 30 is inserted inside the bulkhead 20, and forms an insert passage of the steering shaft 10 to correspond to the opening 21 of the bulkhead 20. The dust cover 30 is formed with a support point 32 that supports the steering shaft 10 when the steering shaft 10 is inserted. The support point 32 is spaced apart from the opening 21 by a predetermined distance and is formed at a lower side of the dust cover 30, and a lower portion of the steering shaft 10 may be supported in contact with the support point 32.

That is, when the steering shaft 10 is inserted through the opening 21 of the bulkhead 20, when inserted into the bulkhead 20 and the dust cover 30, the yoke 12 may move upward by gravity, while the steering shaft 10 of the inserted side may move downward by gravity. In this case, the upper surface of the yoke 12 of the steering shaft 10 is supported on the lower surface of the support surface 22, the end portion of the yoke 12 is supported by the locking protrusion 24, and the lower portion of the steering shaft 10 is supported on the support point 32 formed at the lower side of the dust cover 30. Therefore, after the steering shaft 10 is inserted into the opening 21, it may be supported so as to not be separated in a downward direction of the vehicle body.

A first anti-rotation guide part 26 supporting the upper end of the yoke 12 is formed to prevent rotation about an axis after the steering shaft 10 is inserted into the upper portion of the opening 21 of the bulkhead 20. In addition, in order to prevent the steering shaft 10 from swinging in a left and right direction, between the first anti-rotation guide part 26 on the upper portion of the opening 21 of the bulkhead 20, with a height protruding toward an outside of the opening 21, a first left and right fixed guide part 28 for supporting both sides of the yoke 12 may be formed. Accordingly, after the steering shaft 10 is inserted into the opening 21, the rotation and left and right oscillations thereof may be prevented.

Figure 5:
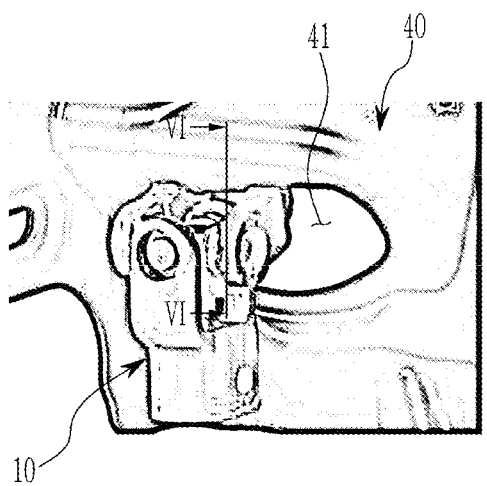
FIG. 5 illustrates a schematic view of a steering shaft temporary support structure of a vehicle according to another embodiment of the present disclosure.
Figure 6:
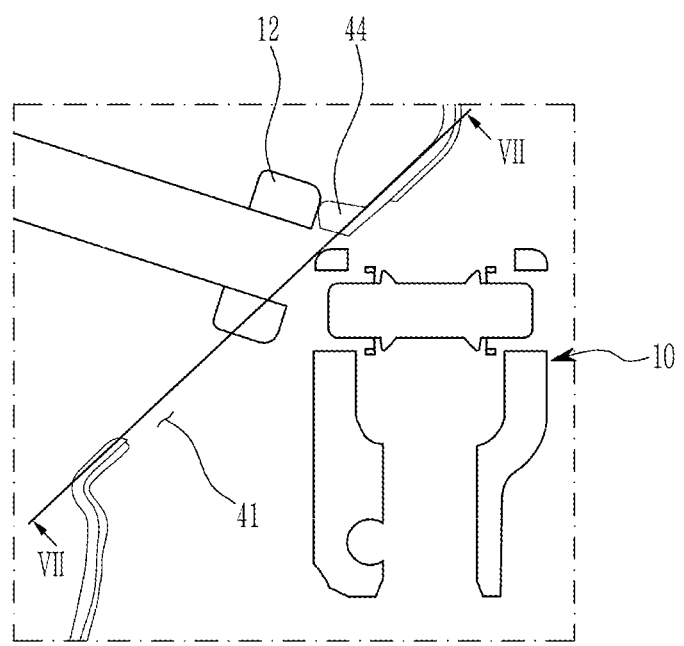
FIG. 6 illustrates a cross-sectional view taken along line VI-VI of FIG. 5.
Figure 7:
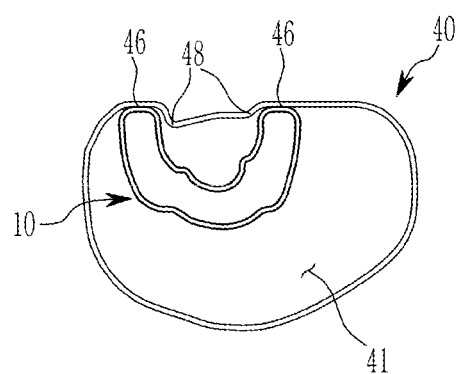
FIG. 7 illustrates a cross-sectional view taken along line VII-VII of FIG. 6.

FIG. 5 illustrates a schematic view of a steering shaft temporary support structure of a vehicle according to another embodiment of the present disclosure, FIG. 6 illustrates a cross-sectional view taken along line VI-VI of FIG. 5, and FIG. 7 illustrates a cross-sectional view taken along line VII-VII of FIG. 6.

Referring to FIGS. 5-7, the steering shaft temporary support structure of the vehicle according to another embodiment of the present disclosure includes a bulkhead 40 and a dust cover. Since the dust cover in the present embodiment is the same as the dust cover described with reference to FIGS. 2-4, a description thereof will be omitted below.

A locking protrusion 44 formed on the bulkhead 40 protrudes toward the inside of the bulkhead 40. In the present embodiment, the steering shaft 10 is inserted in a direction of a state of being rotated about 90° with respect to the insert direction of the steering shaft 10 of the embodiment described with reference to FIGS. 2-4.

After the steering shaft 10 is inserted into the bulkhead 40, the end portion of the yoke 12 is supported on the locking protrusion 44 to be supported so as to not be separated in a downward direction of the vehicle body. Therefore, after the steering shaft 10 is inserted into the opening 41, it may be supported so as to not be separated in a downward direction of the vehicle body.

In addition, a second anti-rotation guide part 46 supporting the upper end of the yoke 12 is formed in the upper portion of the opening 41 of the bulkhead 40 so as to prevent rotation about an axis of the steering shaft 10. In addition, in order to prevent the steering shaft 10 from swinging in the left and right direction, between the second anti-rotation guide part 46 on the upper portion of the opening 41 of the bulkhead 40, with a height protruding toward a center of the opening 41, a second left and right fixed guide part 48 for supporting both sides of the yoke 12 may be formed. Accordingly, after the steering shaft 10 is inserted into the opening 41, the rotation and left and right oscillations thereof may be prevented.

That is, the steering shaft temporary support structure according to the embodiment of the present disclosure has a feature in which the locking protrusion 44 protrudes into the bulkhead 40, unlike a feature in which the steering shaft temporary support structure of the embodiment described with reference to FIGS. 2-4 includes the locking protrusion 24 protruding to the outside of the bulkhead 20, the first anti-rotation guide part 26, and the first left and right fixed guide part 28; and it has a feature in which the second anti-rotation guide part 46 and the second left and right fixed guide parts 48 do not protrude to the outside of the bulkhead 40, but form the shape of the opening 41 of the bulkhead 40.

Figure 8:
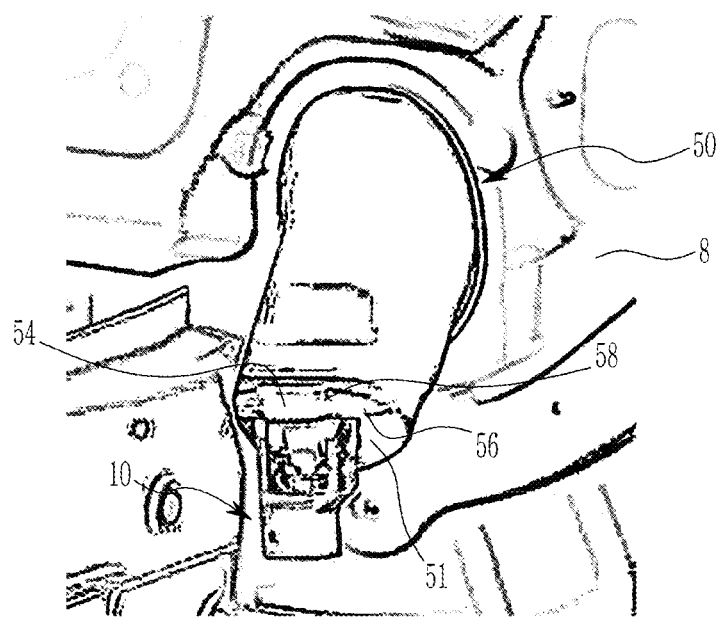
FIG. 8 illustrates a schematic view of a steering shaft temporary support structure of a vehicle according to another embodiment of the present disclosure.

FIG. 8 illustrates a schematic view of a steering shaft temporary support structure of a vehicle according to another embodiment of the present disclosure.

Referring to FIG. 8, the steering shaft temporary support structure of the vehicle according to another embodiment of the present disclosure includes a dust cover 50 formed with an opening 51 into which the steering shaft 10 is inserted, and the dust cover 50 is formed with a locking protrusion 54 and a support point. The steering shaft temporary support structure according to the embodiment of the present disclosure does not include a bulkhead, and the dust cover 50 is formed with the locking protrusion 54 and the support point, unlike the embodiment described with reference to FIGS. 2-7.

The locking protrusion 54 protrudes to an outside of the dust cover 50, and the end portion of the yoke 12 of the steering shaft 10 is supported on the locking protrusion 54, so that the steering shaft 10 is supported so that it is not separated in a downward direction. In addition, the steering shaft 10 is supported inside the dust cover 50 at the support point. The steering shaft temporary support structure according to the embodiment of the present disclosure may further include a support surface for supporting the upper surface of the yoke 12 of the steering shaft 10. Therefore, after the steering shaft 10 is inserted into the opening 51, it may be supported so as to not be separated in a downward direction of the vehicle body.

A third anti-rotation guide part 56 supporting the upper end of the yoke 12 is formed to prevent rotation about an axis after the steering shaft 10 is inserted into the upper portion of the opening 51 of the dust cover 50. In addition, in order to prevent the steering shaft 10 from swinging in the left and right direction, between the third anti-rotation guide part 56 on the upper portion of the opening 51 of the dust cover 50, with a height protruding toward the outside of the opening 51, a third left and right fixed guide part 58 for supporting both sides of the yoke 12 may be formed. Accordingly, after the steering shaft 10 is inserted into the opening 51, the rotation and left and right oscillations thereof may be prevented.

That is, the locking protrusion 54 formed in the opening 51 of the dust cover 50, the third anti-rotation guide part 56, and the third left and right fixed guide part 58 included in the steering shaft temporary support structure according to the embodiment of the present disclosure are substantially the same as the locking protrusion 24 formed in the opening 21 of the bulkhead 20, the first anti-rotation guide part 26, and the first left and right fixed guide part 28 included in the structure described with reference to FIGS. 2-4.

Figure 9:
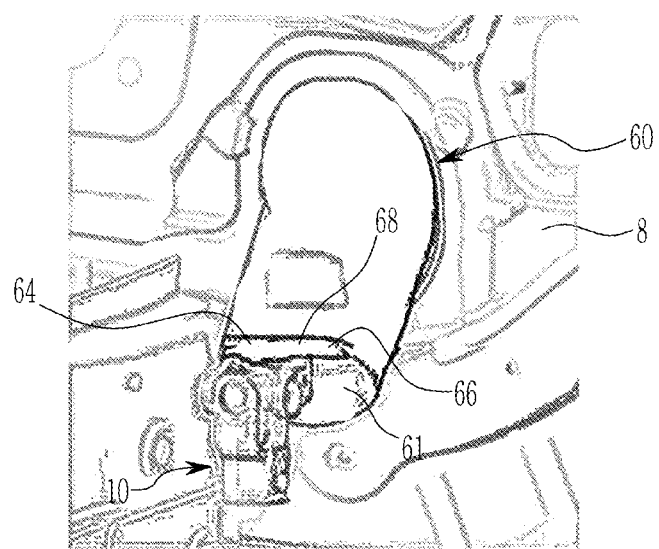
FIG. 9 illustrates a schematic view of a steering shaft temporary support structure of a vehicle according to another embodiment of the present disclosure.

FIG. 9 illustrates a schematic view of a steering shaft temporary support structure of a vehicle according to another embodiment of the present disclosure.

Referring to FIG. 9, the steering shaft temporary support structure of the vehicle according to another embodiment of the present disclosure includes a dust cover 60 formed with an opening 61 into which the steering shaft 10 is inserted, and the dust cover 60 is formed with a locking protrusion 64 and a support point. The locking protrusion 64 is formed to protrude from the opening 61 toward an inside of the dust cover 60.

After the steering shaft 10 is inserted into the dust cover 60, the end portion of the yoke 12 is supported on the locking protrusion 64 to be supported so as to not be separated in a downward direction of the vehicle body. Therefore, after the steering shaft 10 is inserted into the opening 61, it may be supported so as to not be separated in a downward direction of the vehicle body.

On the upper portion of the opening 61 of the dust cover 60, a fourth anti-rotation guide part 66 for supporting the upper end of the yoke 12 to prevent rotation of the steering shaft 10 about an axial center thereof is formed; and in order to prevent the steering shaft 10 from swinging in the left and right direction, between the fourth anti-rotation guide part 66 on the upper portion of the opening 51 of the dust cover 50, with a height protruding toward the center of the opening 51, a fourth left and right fixed guide part 68 for supporting both sides of the yoke 12 is formed. Accordingly, after the steering shaft 10 is inserted into the opening 61, the rotation and left and right oscillations thereof may be prevented.

The steering shaft temporary support structure according to the embodiment of the present disclosure is characterized in that it does not include a bulkhead, and the dust cover 60 is formed with the locking protrusion 64 and the support point, unlike the embodiment described with reference to FIGS. 2-7. In addition, unlike the feature in which the embodiment described with reference to FIG. 8 includes the locking protrusion 54 protruding to the outside of the dust cover 50, the third anti-rotation guide part 56, and the third left and right fixed guide part 58, the embodiment of the present disclosure has the feature in which the locking protrusion 64 protrudes to the inside of the dust cover 60, and the fourth anti-rotation guide part 66 and the fourth left and right fixed guide part 68 do not protrude to the outside of the dust cover 60 and form the opening 61 of the dust cover 60.

As described above, according to the embodiment of the present disclosure, it is possible to reduce a cost and weight by applying a structure that may temporarily support a steering shaft by using its own weight without applying a separate fixing member.

In addition, it is possible to reduce assembly time by omitting fixing and releasing work of a steering shaft by a fixing member.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A steering shaft temporary support structure of a vehicle that is connected by a yoke, comprising:
   a bulkhead that is mounted on surfaces of a dash panel and a housing inside the vehicle, surrounds an engine compartment, and is formed with an opening into which a steering shaft is inserted; and
   a dust cover that forms an insert passage of the steering shaft to correspond to the opening of the bulkhead,
   wherein the bulkhead includes a locking protrusion in which an end portion of the yoke is supported so as to not be separated in a downward direction.

2. The steering shaft temporary support structure of the vehicle of claim 1, wherein the dust cover includes a support point that supports the steering shaft.

3. The steering shaft temporary support structure of the vehicle of claim 2, wherein the support point is formed at a lower portion of the dust cover spaced apart from the opening and when the steering shaft is inserted within the bulkhead, a lower portion of the steering shaft is supported in contact with the support point by a weight of the steering shaft.

4. The steering shaft temporary support structure of the vehicle of claim 1, wherein the locking protrusion is formed to protrude from the opening toward an outside of the bulkhead.

5. The steering shaft temporary support structure of the vehicle of claim 1, wherein the bulkhead further includes a support surface that supports an upper surface of the yoke of the steering shaft.

6. The steering shaft temporary support structure of the vehicle of claim 5, wherein in an upper portion of the opening of the bulkhead, a first anti-rotation guide part that supports an upper end of the yoke is formed to prevent rotation of the steering shaft about an axial center thereof.

7. The steering shaft temporary support structure of the vehicle of claim 6, wherein in the upper portion of the opening of the bulkhead, a first left and right fixed guide part that supports both sides of the yoke is formed with a height protruding toward an outside of the opening, between the first anti-rotation guide part, so as to prevent the steering shaft from swinging in a left and right direction.

8. The steering shaft temporary support structure of the vehicle of claim 5, wherein the support surface is formed to protrude from the opening toward an inside of the bulkhead, and when the steering shaft is inserted within the bulkhead, an upper surface of the yoke is supported in contact with a lower surface of the support surface by a weight of the steering shaft.

9. The steering shaft temporary support structure of the vehicle of claim 1, wherein the locking protrusion is formed to protrude from the opening toward an inside of the bulkhead.

10. The steering shaft temporary support structure of the vehicle of claim 9, wherein in an upper portion of the opening of the bulkhead, a second anti-rotation guide part that supports an upper end of the yoke is formed to prevent rotation of the steering shaft about an axial center thereof.

11. The steering shaft temporary support structure of the vehicle of claim 10, wherein in the upper portion of the opening of the bulkhead, a second left and right fixed guide part that supports both sides of the yoke is formed with a height protruding toward a center of the opening, between the second anti-rotation guide part, so as to prevent the steering shaft from swinging in a left and right direction.

12. A steering shaft temporary support structure of a vehicle that is connected by a yoke, comprising:
a dust cover formed with an opening into which a steering shaft is inserted,
wherein the dust cover includes a locking protrusion on which an end portion of the yoke is supported so as to not be separated in a downward direction, and a support point supporting the steering shaft.

13. The steering shaft temporary support structure of the vehicle of claim 12, wherein the locking protrusion is formed to protrude from the opening toward an outside of the dust cover.

14. The steering shaft temporary support structure of the vehicle of claim 13, wherein the dust cover further includes a support surface that supports an upper surface of the yoke of the steering shaft.

15. The steering shaft temporary support structure of the vehicle of claim 14, wherein in an upper portion of the opening of the dust cover, a third anti-rotation guide part that supports an upper end of the yoke is formed to prevent rotation of the steering shaft about an axial center thereof.

16. The steering shaft temporary support structure of the vehicle of claim 15, wherein in the upper portion of the opening of the dust cover, a third left and right fixed guide part that supports both sides of the yoke is formed with a height protruding toward the outside of the opening, between the third anti-rotation guide part, so as to prevent the steering shaft from swinging in a left and right direction.

17. The steering shaft temporary support structure of the vehicle of claim 14, wherein:
the support surface is formed to protrude from the opening toward an inside of the dust cover, and
when the steering shaft is inserted within the dust cover, an upper surface of the yoke is supported in contact with a lower surface of the support surface by a weight of the steering shaft.

18. The steering shaft temporary support structure of the vehicle of claim 12, wherein the locking protrusion is formed to protrude from the opening toward an inside of the dust cover.

19. The steering shaft temporary support structure of the vehicle of claim 18, wherein in an upper portion of the opening of the dust cover, a fourth anti-rotation guide part that supports an upper end of the yoke is formed to prevent rotation of the steering shaft about an axial center thereof.

20. The steering shaft temporary support structure of the vehicle of claim 19, wherein in the upper portion of the opening of the dust cover, a fourth left and right fixed guide part that supports both sides of the yoke is formed with a height protruding toward a center of the opening, between the fourth anti-rotation guide part, so as to prevent the steering shaft from swinging in a left and right direction.

* * * * *